United States Patent
Drane et al.

(10) Patent No.: US 7,674,990 B2
(45) Date of Patent: Mar. 9, 2010

(54) INTUMESCENT COVER FOR A POKE-THROUGH ASSEMBLY

(75) Inventors: Mark R. Drane, Germantown, TN (US); Robert K. Jolly, Cordova, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 11/752,964

(22) Filed: May 24, 2007

(65) Prior Publication Data

US 2008/0135285 A1 Jun. 12, 2008

Related U.S. Application Data

(60) Provisional application No. 60/868,944, filed on Dec. 7, 2006.

(51) Int. Cl.
*H02G 3/04* (2006.01)

(52) U.S. Cl. .................. 174/483; 174/57; 174/50; 439/650

(58) Field of Classification Search ......... 174/480–496, 174/57, 50, 51; 439/135, 535, 536, 650, 439/652; 52/220.5, 220.8, 220.7; 220/3.3, 220/3.4, 3.5
See application file for complete search history.

(56) References Cited

U.S. PATENT DOCUMENTS

| | | |
|---|---|---|
| 3,751,576 A | 8/1973 | Klinkman et al. |
| 3,864,883 A | 2/1975 | McMarlin |
| 4,086,736 A | 5/1978 | Landrigan |
| 4,099,020 A | 7/1978 | Kohaut |
| 4,221,092 A | 9/1980 | Johnson |
| 4,272,643 A | 6/1981 | Carroll et al. |
| 4,336,416 A | 6/1982 | Goodsell |
| 4,364,210 A | 12/1982 | Fleming et al. |
| 4,419,535 A | 12/1983 | O'Hara |
| 4,477,694 A | 10/1984 | Kohaut |
| 4,573,297 A | 3/1986 | Benscoter et al. |
| 4,619,087 A | 10/1986 | Harbeke |
| 4,642,956 A | 2/1987 | Harbeke |
| 4,646,486 A | 3/1987 | Hauff |
| 4,669,759 A | 6/1987 | Harbeke |
| 4,748,787 A | 6/1988 | Harbeke |
| 4,848,043 A | 7/1989 | Harbeke |
| 4,882,886 A | 11/1989 | Harbeke |
| 4,888,925 A | 12/1989 | Harbeke |
| 4,916,800 A | 4/1990 | Harbeke |

(Continued)

*Primary Examiner*—Dhiru R Patel
(74) *Attorney, Agent, or Firm*—Hoffmann & Baron, LLP

(57) ABSTRACT

One aspect of the present invention provides a poke-through assembly for installation in a hole in a floor structure. The floor structure defines a floor in a first working environment and a ceiling in a second working environment. The poke-through assembly includes at least one intumescent member, a base plate and an intumescent enclosure. The intumescent member is disposed at least partially between the floor of the first working environment and the ceiling of the second working environment. The base plate supports and is disposed below the intumescent member for limiting the expansion of the intumescent member toward or into the second working environment. Another aspect of the present invention provides a poke-through assembly including an upper frame, at least one intumescent member and an intumescent cover. The intumescent member is disposed below the upper frame. The intumescent cover supports the intumescent member and circumferentially surrounds at least a portion of the intumescent member, wherein expansion of the intumescent member is impeded by the cover.

20 Claims, 5 Drawing Sheets

U.S. PATENT DOCUMENTS

| | | |
|---|---|---|
| 4,918,761 A | 4/1990 | Harbeke |
| 4,951,442 A | 8/1990 | Harbeke, Jr. |
| 5,032,690 A | 7/1991 | Bloom |
| 5,035,097 A | 7/1991 | Cornwall |
| 5,155,957 A | 10/1992 | Robertson et al. |
| 5,293,724 A | 3/1994 | Cornwall |
| 5,309,688 A | 5/1994 | Robertson |
| 5,347,767 A | 9/1994 | Roth |
| 5,390,465 A | 2/1995 | Rajecki |
| 5,417,019 A | 5/1995 | Marshall et al. |
| 5,452,551 A | 9/1995 | Charland et al. |
| 5,634,304 A | 6/1997 | Sakno |
| 6,175,078 B1 | 1/2001 | Bambardekar et al. |
| 6,305,133 B1 | 10/2001 | Cornwall |
| 6,405,502 B1 | 6/2002 | Cornwall |
| 6,417,446 B1 * | 7/2002 | Whitehead .................. 174/484 |
| 6,495,753 B1 * | 12/2002 | Goodsell et al. ............ 174/483 |
| 6,518,498 B1 | 2/2003 | Bonilla et al. |
| 6,848,227 B2 | 2/2005 | Whitty |
| 6,854,226 B2 | 2/2005 | Cole et al. |
| 6,989,488 B2 | 1/2006 | Valenziano |
| 7,166,798 B2 * | 1/2007 | Cole ......................... 174/490 |
| 7,271,351 B2 | 9/2007 | Drane |
| 7,442,883 B2 | 10/2008 | Jolly et al. |
| 2008/0053697 A1 | 3/2008 | Bowman |

* cited by examiner

US 7,674,990 B2

INTUMESCENT COVER FOR A POKE-THROUGH ASSEMBLY

CROSS-REFERENCE TO RELATED APPLICATIONS

This application claims the benefit of U.S. Provisional Patent Application Ser. No. 60/868,944 filed on Dec. 7, 2006.

BACKGROUND OF THE INVENTION

A poke-through assembly or simply a "poke-through" is a common device that enables power, data or other cabling to pass through a hole between floors in a building, generally a concrete floor. A thermal barrier in the form of a fire and/or smoke retardant element, particularly intumescent material, is incorporated within the poke-through. The intumescent serves as a fire-stop and expands to seal any remaining space within the poke-through and the surrounding hole in which it is installed. This helps prevent the spread of fire and/or smoke from one floor to the next.

Contemporary poke-throughs provide access between an upper floor and an immediately adjacent lower floor. The poke-through assembly is usually installed with a cover which serves as a cap or lid for the hole. Also, the poke-through generally includes an upper frame or basket designed to create an easily accessible cavity or recess at the surface of the upper floor. Alternatively, such frames or baskets can be used to hold power and/or data receptacles therein. The upper frame is generally metallic and is in direct contact with a cover plate or the upper flooring itself. A lower end of the contemporary poke-through is connected to a junction box accessible to an adjacent lower floor. The lower end generally has open sides that hold intumescent material. Such an open configuration for the intumescent allows it to fully expand when heated, and theoretically seal the poke-through hole. However, the intumescent material does not generally provide a stable rigid support structure, especially when heated substantially. Thus, the expanding intumescent material will squeeze its way out the bottom of the poke-through assembly and big chunks of the material can break-off. This causes a loss of intumescent material, which can compromise the fire-stop capability for which it was intended.

There is therefore a need for a poke-through assembly that prevents the loss of and/or provides an intumescent cover for the intumescent material. Such an improved assembly must be inexpensive, and manufactured and installed easily. Additionally, it would be beneficial if the improved assembly or at least portions thereof could be retrofit into existing poke-throughs without replacing the entire existing assembly.

SUMMARY OF THE INVENTION

One aspect of the present invention provides a poke-through assembly for installation in a hole in a floor structure. The floor structure defines a floor in a first working environment and a ceiling in a second working environment. The poke-through assembly includes at least one intumescent member, a base plate and an intumescent enclosure. The intumescent member is disposed at least partially between the floor of the first working environment and the ceiling of the second working environment. The base plate supports and is disposed below the intumescent member for limiting the expansion of the intumescent member toward or into the second working environment.

Another aspect of the present invention provides a poke-through assembly including an upper frame, at least one intumescent member and an intumescent cover. The intumescent member is disposed below the upper frame. The intumescent cover supports the intumescent member and circumferentially surrounds at least a portion of the intumescent member, wherein expansion of the intumescent member is impeded by the cover.

Additionally, the cover can include a base plate and an annular band or enclosure secured to the perimeter of the base plate. The base plate can support and be disposed below the intumescent member. Also, the enclosure can circumferentially surrounding at least a portion of the at least one intumescent member and be capable of restraining radial expansion of the intumescent member.

Additionally, the cover can be fixedly secured to the upper frame. Also, the cover can be coupled to a conduit disposed below the cover. Additionally, the cover can include a first conduit aperture, wherein the first conduit aperture communicates with the an inner passage of the conduit. Further, the first conduit aperture can include an internal threading for coupling to the conduit. Further still, the base plate can include at least one second conduit aperture.

Additionally, the enclosure of the poke-through assembly can circumferentially surround substantially the entire intumescent member. Also, the enclosure can include a plurality of apertures for allowing expansion of the intumescent member outside the cover or enclosure. Further, the plurality of apertures can include many perforations distributed around the cover.

These and other objects, features, and advantages of this invention will become apparent from the following detailed description of illustrative embodiments thereof, which is to be read in connection with the accompanying drawings.

DETAILED DESCRIPTION OF THE PREFERRED EMBODIMENTS

This invention pertains to a poke-through assembly with improved heat isolation features, particularly in the form of a cover for retaining the intumescent material used in a fire-rated electrical poke-through assembly. Also, the features of the present invention are relatively inexpensive, manufactured easily and quickly installed. Additionally, the features of the present invention can be retrofit into existing poke-through assemblies without replacing the entire assembly.

Figure 1A:
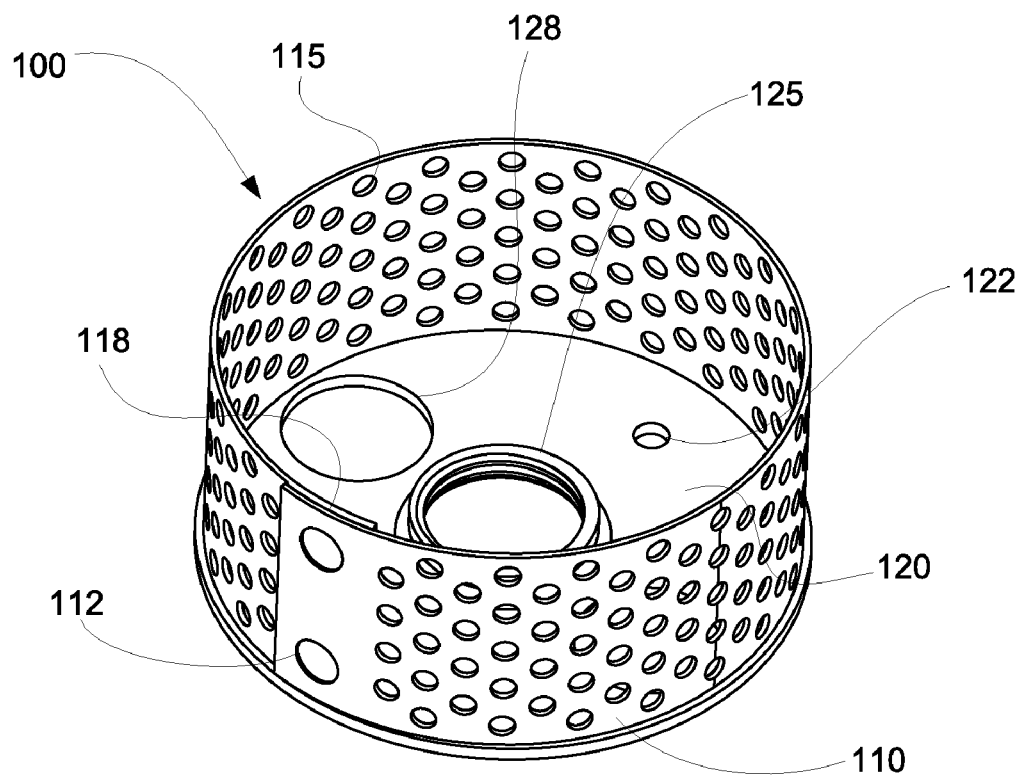
FIGS. 1a and 1b are respectively top and bottom perspective views of one embodiment of an intumescent cover in accordance with the present invention.
Figure 1B:
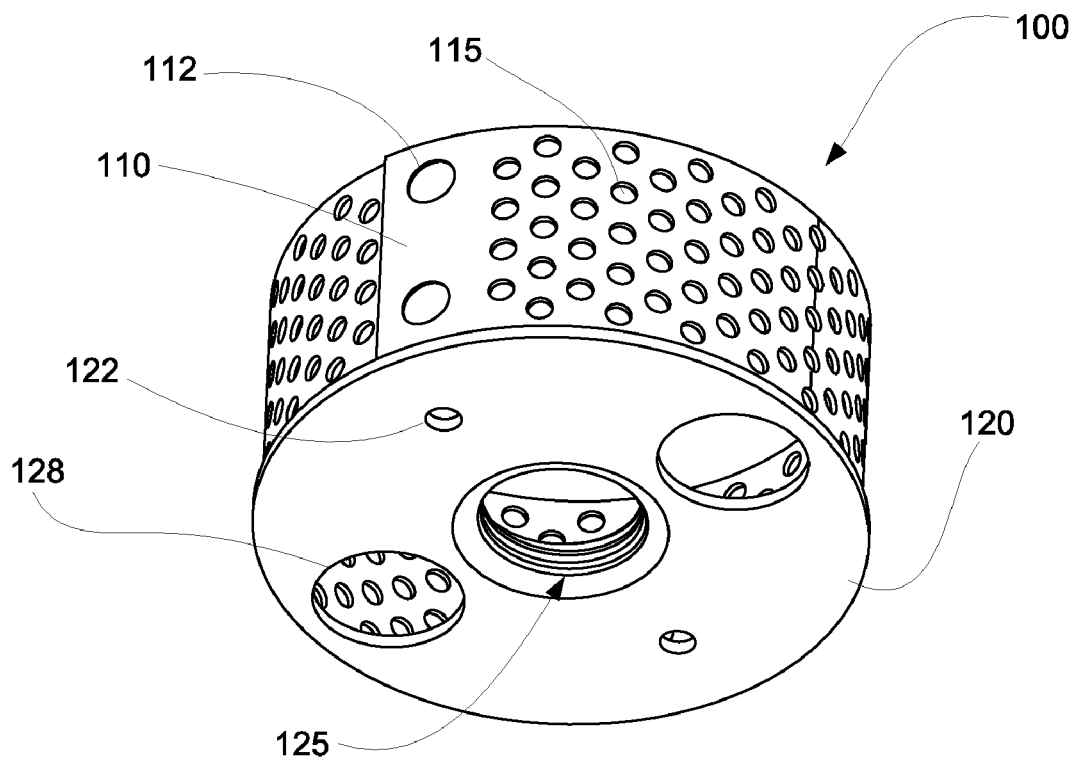

FIGS. 1a and 1b show an intumescent retainer or cover 100, in accordance with one embodiment of the present invention. The cover 100, preferably includes a perforated steel enclosure 110, in the form of an annular band that is attached to a steel lower plate 120. The enclosure 110 rises vertically from the lower plate 120, together forming a cup that can cover the lower portions of the poke-through assembly, and particularly the intumescent material (shown in FIGS. 2 and 3). Preferably, when fully assembled in the poke-through, neither the enclosure 110 nor the lower plate 120 is directly attached to the intumescent material. However, the enclosure 110 and lower plate 120 do preferably cover at least the lower portion of the intumescent material.

The enclosure 110 preferably includes apertures 115 in the form of holes or perforations, through which intumescent material can expand during a fire. Preferably, the intumescent material while expanding should be able to extrude through or past the apertures 115 and abut the inner side-walls of the poke-through hole. In this way, the enclosure 110 still allows radial expansion of intumescent material which provides a fire stop, but restricts and retains a portion of the material. Also, once the intumescent material expands through the aperture 115, the enclosure 110 acts as a structural reinforcement for the intumescent member(s). This reinforcement can help prevent large chunks of intumescent material from breaking off or away from the overall assembly. Alternatively, the enclosure 110 could be generally solid, with the aperture taking the form of one or more gaps or openings in the enclosure 110 functioning to allow passage therethrough of the expanding intumescent material 200. Also, as a further alternative, a solid version of the enclosure 110 could simply be shorter than the height of the intumescent material. Thus, the aperture for such a short enclosure is provided by allowing expansion to occur over and beyond the top rim of the short enclosure.

It should be understood that while perforations 115 are shown to be circular, almost any shape or size could be provided. Also, the perforations 115 need not be distributed evenly across most of the enclosure 110. For example, the perforations 115 could be provided only on a portion of the enclosure 110, such as near the top or bottom edge thereof. Further, the perforations 115 could be larger or smaller than that shown, and they need not all be the same size or shape. Additionally, the enclosure 110 could be formed of a wire mesh, thus increasing the amount of intumescent that can pass therethrough.

As shown, the enclosure 110 is preferably formed with an overlapping structure 118. The overlap 118 provides a region 112 for spot welding or otherwise securing the two ends Of the enclosure 110 to maintain a closed annular form. Also, the enclosure 110 is preferably secured to the lower plate 120. In fact, the overlapping structure 118 could alternatively be eliminated allowing a weld or bond between the plate 120 and the enclosure 110 to maintain the shape and position of the enclosure 110.

Figures 2, 3:
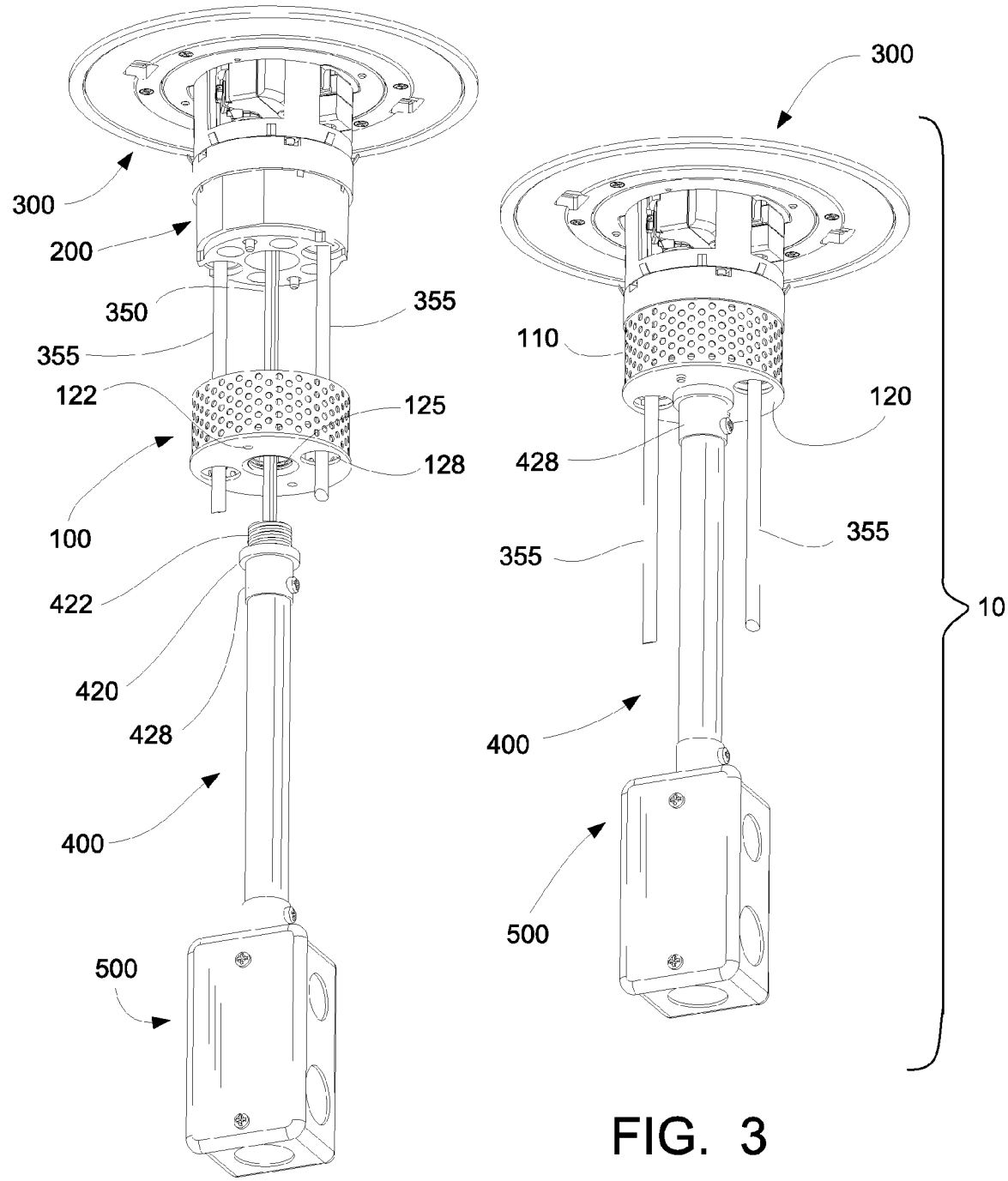
FIG. 2 is a bottom partially exploded perspective view of a poke-through assembly in accordance with the present invention.
FIG. 3 is a bottom perspective assembled view of the poke-through assembly shown in FIG. 2.

Preferably, the lower plate 120 includes different apertures 122, 125 and 128 from those discussed above in the enclosure 110. The lower plate apertures 122, 125, 128 primarily provide passage for other parts of the assembly, rather than the expanding intumescent material. As shown in FIG. 2, apertures 122 preferably receive a rod or bolt for coupling the lower plate 120 to the upper frame 300. In this way, the cover 100 is secured to the upper poke-through assembly and holds the intumescent material 200 in place without being directly secured to it. Additionally, apertures 128 allow the passage therethrough of cables, such as communication cables 355. In contrast, aperture 125 preferably provides passage for power cables 350. Also, aperture 125 is preferably provided with an inner threading or other coupling configuration for mating with an upper portion 422 of the lower conduit assembly 400. However, all the lower plate apertures 122, 125 and 128 could be formed with threads or similar mating features. It should be understood that additional apertures could be provided. Also, while the apertures 115 are intended to allow intumescent material to pass therethrough, the lower plate apertures 122, 125 and 128 are not. In fact, the lower plate apertures 122, 125 and 128 are preferably sized as small as possible, while still easily accommodating the intended wiring or conduit.

As shown in FIG. 3, the cover 100 preferably enclosed substantially all of the lower and side surfaces of the intumescent material 200. However, alternatively a portion of the intumescent, such as an upper portion, may remain uncovered. As mentioned above, such an upper gap (not shown) would act like an aperture 115, in allow expanding intumescent material to pass.

Also shown in FIGS. 2 and 3 are the lower conduit assembly 400 and the junction box 500. Notably, the conduit assembly 400 preferably includes an upper coupling 420, which includes a threaded portion 422 and mating collar 428. As mentioned above, the threaded portion 422 preferably mates with an inner threading in the cover aperture 125. The mating collar 428, preferably mates with power conduit that leads to junction box 500.

Figure 4:
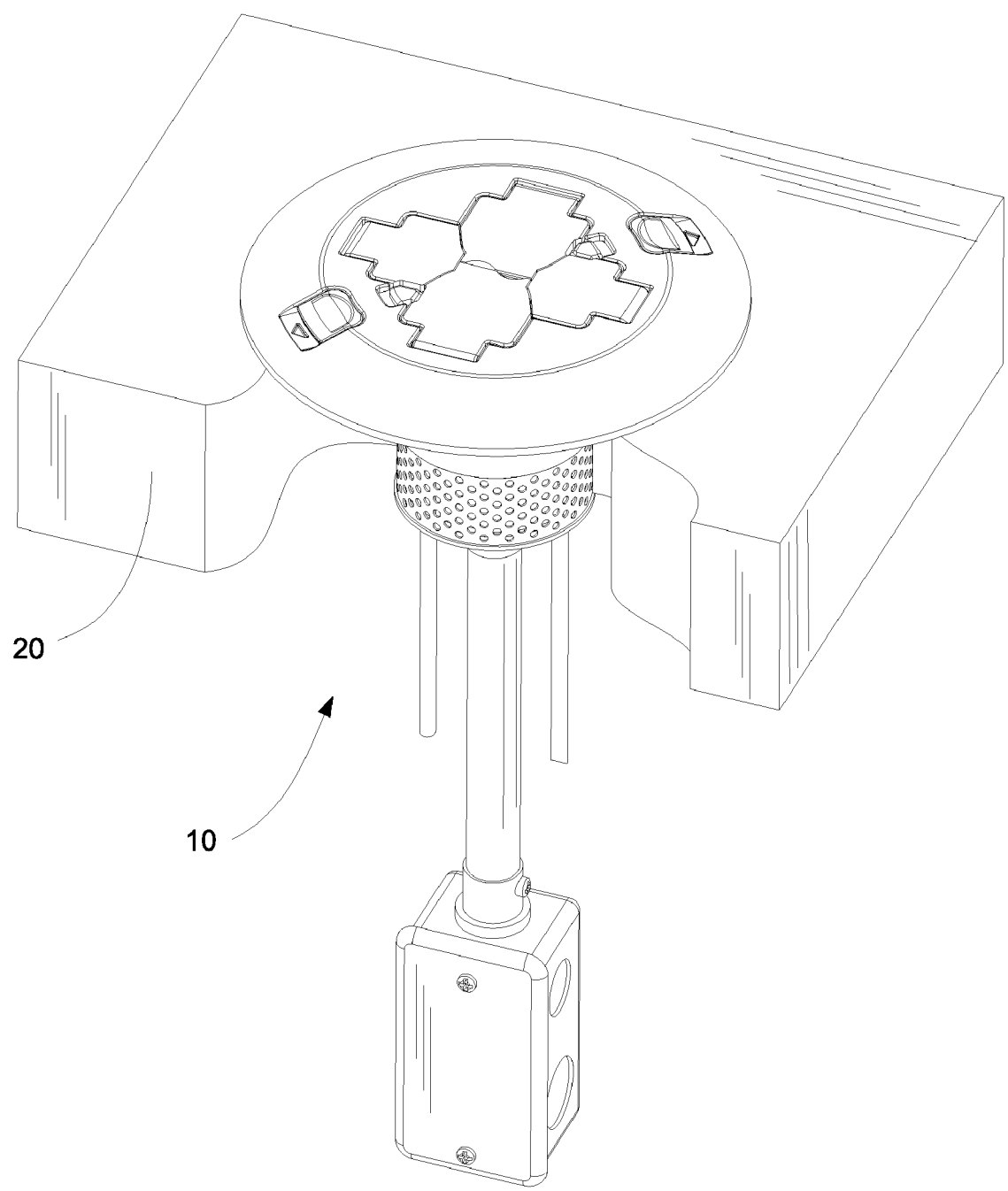
FIG. 4 is a top perspective view of the poke-through assembly shown in FIG. 3 inserted in a concrete slab, with a cutaway of a portion of the slab.
Figure 5:
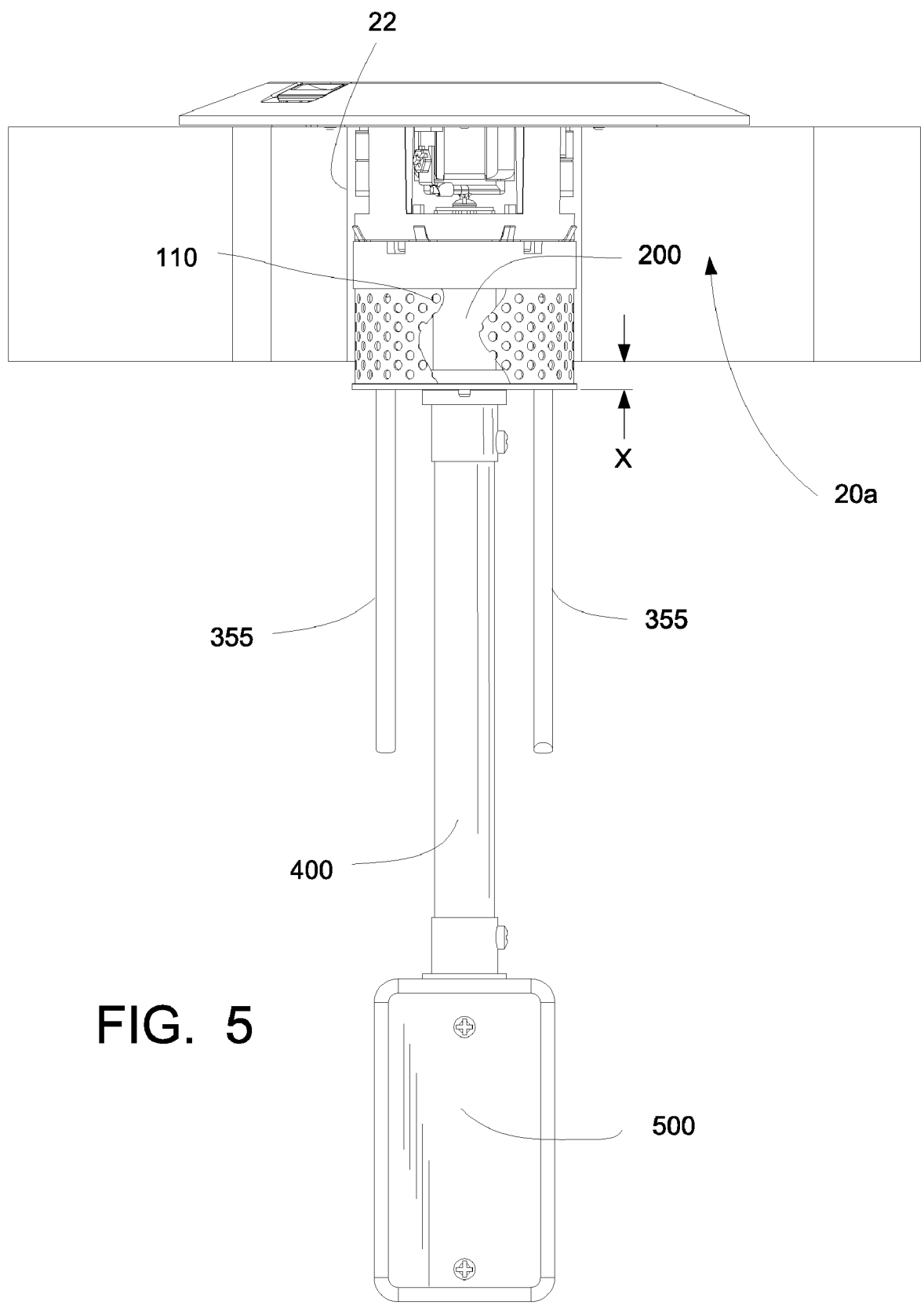
FIG. 5 is a side section view of the poke-through assembly shown in FIG. 3 inserted in a thick concrete slab.
Figure 6:
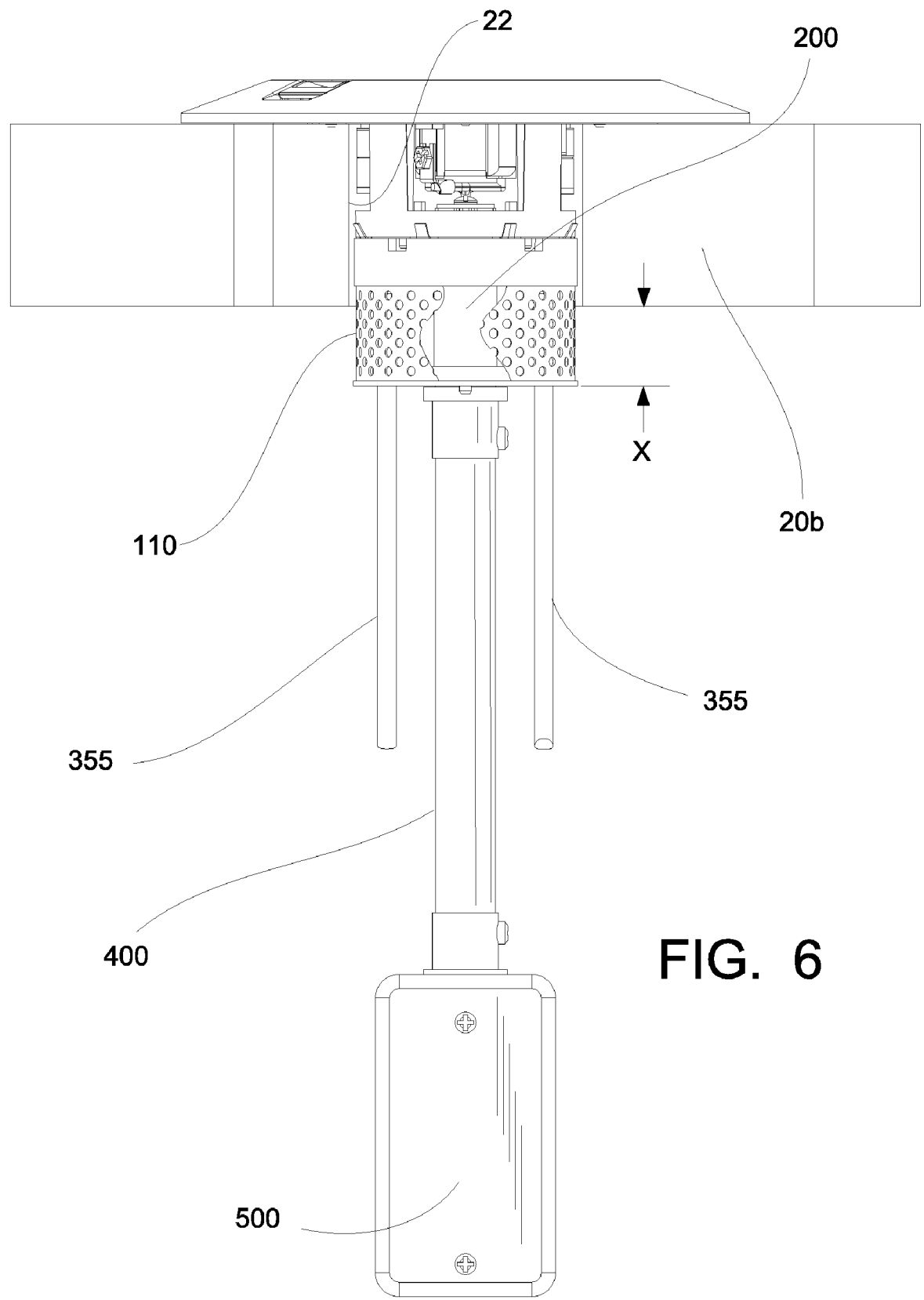
FIG. 6 is a side section view of the poke-through assembly shown in FIG. 3 inserted in a thin concrete slab.

FIG. 4 shows the poke-through assembly 10 installed in hole 22 in a floor structure 20. Similarly, FIGS. 5 and 6 show the contrast between an installation in a first thicker floor 20$a$ and a second thinner floor 20$b$. It should be understood that the assembly 10 of the present invention could be used in even thinner or thicker floors than that shown. However, FIGS. 5 and 6 particularly illustrate advantages of the present invention when the installed intumescent material 200 protrudes a distance X below the lower surface of the floor structure 20$a$, 20$b$. This distance or gap X is defined by the space between the floor structure 20$a$, 20$b$ and the base plate 120 that supports the intumescent material 200. It should be noted that the gap X is larger for the thinner floor 20$b$ than the thicker floor 20$a$. Without the cover 100 of the present invention, expanding intumescent material 200 would ooze out bottom of the poke-through assembly. Also, even if just a bottom plate where provided without the enclosure 110, intumescent material 200 could squeeze through the gap X and potentially separate from the assembly. In a configuration as shown in FIG. 6, even a minor loss of intumescent material 200 could mean it no longer engages the side walls of the hole 22, thus reducing the sealing and/or fire-stop capability of the assembly. Accordingly, the enclosure 110 and the lower plate 120 together retain the intumescent material 200 and control its release (expansion).

While the cover 100 shown forms a cup-like member, with various openings and cutouts, it should be understood that this element could have many variations known in the art. Additionally, while the cover 100 can be made of various materials, it is preferably made of stainless steel, die-cast zinc or aluminum.

Although illustrative embodiments of the present invention have been described herein with reference to the accompanying drawings, it is to be understood that the invention is not limited to those precise embodiments, and that various other changes and modifications may be applied therein by one skilled in the art without departing from the scope or spirit of the invention.

What is claimed is:

1. A poke-through assembly for installation in a hole in a floor structure, said floor structure defining a floor in a first working environment and a ceiling in a second working environment, said poke-through assembly comprising:

an intumescent member disposed at least partially between said floor and said ceiling;

a base plate for supporting said at least one intumescent member, said plate disposed below said intumescent member for limiting the expansion of said intumescent member toward or into said second working environment; and an enclosure fixedly secured directly to said base plate, said enclosure extending vertically from said base plate and circumferentially surrounding at least a lower portion of said intumescent member, wherein said enclosure includes a plurality of apertures, wherein expansion of said at least one portion passes through said apertures to form a fire stop between said poke-through and a wall of said hole in the floor.

2. The poke-through assembly as set forth in claim 1, wherein said intumescent member can expand radially outwardly through said apertures.

3. The poke-through assembly as set forth in claim 2, wherein said plurality of apertures includes perforations distributed around said enclosure.

4. The poke-through assembly as set forth in claim 1, wherein said enclosure surrounds substantially all of said intumescent member.

5. The poke-through assembly as set forth in claim 4, further comprising:
a conduit disposed below and coupled to said base plate.

6. The poke-through assembly as set forth in claim 1, wherein said base plate includes at least one conduit opening for communicating with a conduit.

7. The poke-through assembly as set forth in claim 6, wherein said conduit opening communicates with an inner portion of said conduit.

8. The poke-through assembly as set forth in claim 6, wherein said conduit opening includes an internal threading for coupling to a conduit.

9. The poke-through assembly as set forth in claim 6, wherein said base plate includes at least one cable opening for passing cables therethrough.

10. A poke-through assembly as set forth in claim 1, wherein said base plate includes more than one aperture for passing at least one cable therethrough, the apertures spaced away from one another.

11. A poke-through assembly for installation in a hole in a floor structure, said floor structure defining a floor in a first working environment and a ceiling in a second working environment, said poke-through assembly comprising:
an upper frame;
an intumescent member disposed below said upper frame; and
an intumescent cover supporting a bottom surface of said intumescent member, said intumescent cover circumferentially surrounding at least a lower portion of said intumescent member, wherein said intumescent cover includes a plurality of apertures, wherein expansion of said at least one portion of said intumescent member passes through said apertures to form a fire stop between said poke-through and a wall of said hole in the floor.

12. The poke-through assembly as set forth in claim 11, wherein said intumescent member can expand radially outwardly through said apertures.

13. The poke-through assembly as set forth in claim 12, wherein said intumescent cover is formed by a base plate and an annular band secured to a perimeter of said base plate.

14. The poke-through assembly as set forth in claim 13, further comprising:
a conduit disposed below said intumescent member, wherein said conduit is coupled to said base plate.

15. The poke-through assembly as set forth in claim 11, wherein said intumescent cover is fixedly secured to said upper frame.

16. The poke-through assembly as set forth in claim 11, wherein said intumescent cover includes at least one conduit opening for communicating with a conduit.

17. The poke-through assembly as set forth in claim 16, wherein said conduit opening communicates with an inner passage of said conduit.

18. The poke-through assembly as set forth in claim 16, wherein said conduit opening includes an internal threading for coupling to said conduit.

19. The poke-through assembly as set forth in claim 16, wherein said intumescent cover includes at least one cable opening for passing cables therethrough.

20. The poke-through assembly as set forth in claim 11, wherein said upper frame includes a receptacle receiving portion.

* * * * *